US006558828B1

(12) United States Patent
Guo

(10) Patent No.: US 6,558,828 B1
(45) Date of Patent: May 6, 2003

(54) ZN/AIR CELL PERFORMANCE IN EXTREME HUMIDITY BY CONTROLLING HYDROPHOBIC LAYER POROSITY

(75) Inventor: Jingdong Guo, North Olmsted, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/579,385

(22) Filed: May 26, 2000

(51) Int. Cl.[7] .................................................. H01N 4/00
(52) U.S. Cl. ......................................... 429/27; 429/129
(58) Field of Search ............................... 429/247, 129, 429/132, 137, 145, 229, 27

(56) References Cited

U.S. PATENT DOCUMENTS

| | | | |
|---|---|---|---|
| 3,944,477 A | 3/1976 | Argade ........................ 204/266 |
| 4,104,197 A | 8/1978 | Heffler ...................... 252/425.3 |
| 4,105,830 A | 8/1978 | Kordesch ....................... 429/27 |
| 4,299,646 A | 11/1981 | Sauer et al. ................. 156/278 |
| 4,333,993 A | 6/1982 | Gibbard ........................ 429/27 |
| 4,339,325 A | 7/1982 | Solomon et al. ............. 204/296 |
| 4,404,266 A | * 9/1983 | Smilanich .................... 429/174 |
| 4,440,617 A | 4/1984 | Solomon ................. 204/290 R |
| 4,551,220 A | 11/1985 | Oda et al. ................... 204/294 |
| 4,585,711 A | 4/1986 | Vaidyanathan ................ 429/42 |
| 4,615,954 A | 10/1986 | Solomon et al. ............... 429/27 |
| 4,842,963 A | 6/1989 | Ross, Jr. ....................... 429/21 |
| 4,877,694 A | 10/1989 | Solomon et al. ............... 429/27 |
| 4,894,266 A | 1/1990 | Bauer et al. ................... 429/27 |
| 4,902,423 A | 2/1990 | Bacino .................. 210/500.36 |
| 5,123,937 A | 6/1992 | Shibata et al. .................. 55/16 |
| 5,229,223 A | 7/1993 | Hyland ........................ 429/29 |
| 5,242,763 A | 9/1993 | Konishi et al. ................ 429/27 |
| 5,279,905 A | 1/1994 | Mansfield, Jr. et al. |
| 5,306,578 A | 4/1994 | Ohashi et al. ................. 429/27 |
| 5,308,711 A | 5/1994 | Passaniti et al. .............. 429/29 |
| 5,328,778 A | 7/1994 | Woodruff et al. ............. 429/27 |
| 5,362,577 A | 11/1994 | Pedicini |
| 5,370,836 A | 12/1994 | Yokoyama et al. ......... 264/320 |
| 5,384,685 A | 1/1995 | Tong et al. |
| 5,432,022 A | 7/1995 | Cheiky ......................... 429/27 |
| 5,451,473 A | 9/1995 | Oltman et al. ................. 429/27 |
| 5,464,453 A | 11/1995 | Tong et al. |
| 5,486,429 A | 1/1996 | Thibault ....................... 429/27 |
| 5,547,551 A | 8/1996 | Bahar et al. ................. 204/296 |
| 5,599,614 A | 2/1997 | Bahar et al. ................. 442/171 |
| 5,635,041 A | 6/1997 | Bahar et al. ................. 204/262 |
| 5,702,839 A | 12/1997 | Frost et al. .................... 429/42 |
| 5,707,757 A | 1/1998 | Lee .............................. 429/86 |
| 5,783,325 A | 7/1998 | Cabasso et al. ............... 429/42 |
| 6,005,764 A | 12/1999 | Anderson et al. |

FOREIGN PATENT DOCUMENTS

| | | | |
|---|---|---|---|
| JP | 03210762 | 9/1991 | ............ H01M/2/16 |
| JP | 06231809 | 8/1994 | |
| JP | 07130405 | 5/1995 | |
| JP | 07320744 | 12/1995 | |
| JP | 09082372 | 3/1997 | |
| JP | 09274936 | 10/1997 | |
| JP | 09289045 | 11/1997 | |
| JP | 10040924 | 2/1998 | |
| JP | 10064603 | 3/1998 | |
| TW | 219411 | 1/1994 | |
| TW | 284921 | 9/1996 | |

OTHER PUBLICATIONS

Takamura, et al., "High Performance Zn–Air Cell Using Gas–Selective Permeable Membranes," Power Sources Symp. Brighton, UK (1985).

Morita, et al., "Button–Type Zinc–Air Batteries for Hearing Aids," *National Technical Report*, vol 32, No. 5, pp. 590(62)–596 (68), Oct., 1986.

* cited by examiner

*Primary Examiner*—Randy Gulakowski
*Assistant Examiner*—Monique Wills
(74) *Attorney, Agent, or Firm*—Russell H. Toye, Jr.; Robert W. Welsh

(57) ABSTRACT

An improved air cell, and the method of forming the air cell, is provided. The cell has a uniformly laminated hydrophobic membrane using a high laminating force. The air cell has increased performance in high humidity or low humidity conditions.

23 Claims, 1 Drawing Sheet

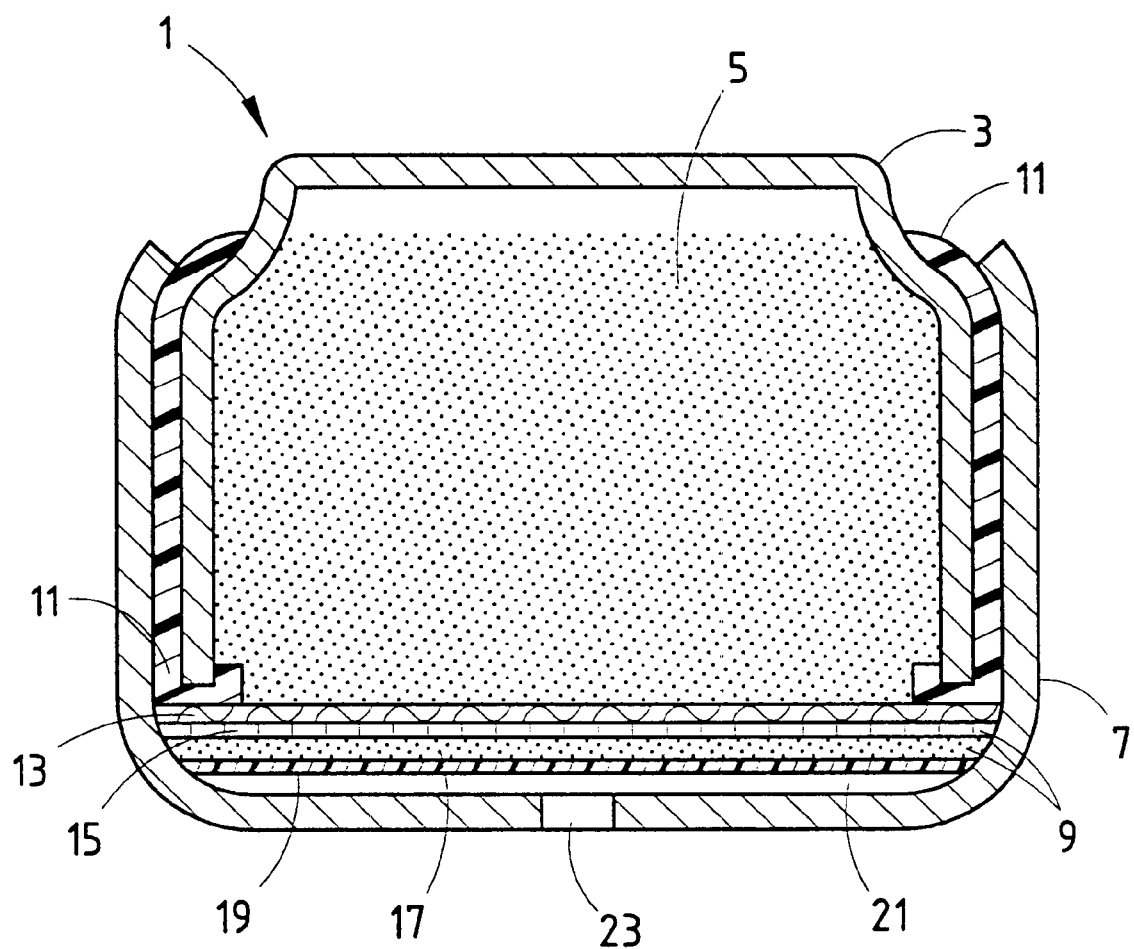

ZN/AIR CELL PERFORMANCE IN EXTREME HUMIDITY BY CONTROLLING HYDROPHOBIC LAYER POROSITY

BACKGROUND OF THE INVENTION

The present invention relates to button air cells, and more particularly to the air electrode in such button air cells.

Miniature air cells, such as alkaline button air cells, are stable high-energy sources for electrical devices such as hearing aids. A continuous supply of air must be provided to the air electrode of the cell for the cell to work. Miniature alkaline air cells generally comprise an outer metal container having at least one air opening in its base to provide air to the active air electrode, a hydrophobic layer, an air electrode, a separator layer, an anode mass, and an electrolyte. The cell also generally includes a gasket and a metal cover to seal the open end of the cell, thereby sealing in the electrolyte.

Button air cells often use a polytetrafluoroethylene (PTFE) film as the hydrophobic layer. Other suitable materials are also known. The PTFE serves as an air transport layer and an electrolyte leakage barrier. The PTFE is normally laminated or bonded to the air electrode. However, heavy lamination of the PTFE to the air electrode shuts down the oxygen supply, causing mass transfer polarization, while low lamination may lead to delamination of the PTFE from the air electrode mix and premature failure of the cell.

Button air cells are used in a variety of different applications and thus are used in a variety of different climates. Humidity can affect the performance of the cell. Therefore, suitable bond strength and appropriate air and water permeability of the PTFE are essential for good cell performance. If the ambient humidity is high, the cell will gain water. This additional water takes up internal volume that is intended to accommodate cell discharge reaction products. As a result, internal pressure can build up in the cell, leading to cell bulging, leakage and reduced discharge capacity. The air electrode can also become flooded with electrolyte, leading to reduced discharge capacity. If the ambient humidity is low, the cell will loose water, which can cause deterioration of cell electrical characteristics and reduced discharge capacity.

U.S. Pat. No. 4,105,830 discloses an air depoloarized cell that compromises a laminated cathode assembly including an air cathode and an auxiliary cathode in combination with a layer of a thin nonporous gas permeable membrane, which is disposed with one side over the air cathode and with the opposite side having substantially unrestricted access to the atmosphere through a gas diffusion member. The nonporous membrane controls the transfer of oxygen from the ambient atmosphere to the air cathode exclusively by gas solubility with its permeability to oxygen selected to correspond to a predetermined average current density for the cell.

U.S. Pat. No. 5,587,259 discloses a metal current collecting substrate for an air cathode in an electromechanical metal air cell, wherein the substrate is hardened by one of the steps of sandblasting, shotblasting, plastic deformation of the substrate below the recrystallization temperature range of the metal thereof, and heating the substrate to above the transformation temperature of the metal, followed by quenching the substrate below the transformation temperature of the metal. Catalytically active materials are pressed or otherwise disposed upon the hardened substrate. The substrate is capable of being connected to electrical circuitry. The substrate can be a metal screen that has been hardened, roughened and pitted by sandblasting before the catalytically active materials are disposed thereupon, and before the substrate is incorporated into an electromechanical metal air cell.

In the past, two other approaches have also been taken to improve cells intended for use in high humidity environments. One is to reduce the electrolyte concentration so that the partial pressure of water inside the cell will be in equilibrium with the ambient water vapor pressure at a higher relative humidity. The other is to increase the void volume in the cell by reducing electrode and/or electrolyte volumes. Both of these approaches sacrifice discharge capacity in an effort to reduce cell bulging and leakage.

Thus, there is a need for an air electrode configuration for use in button cells that results in improved performance in high or low humidity conditions.

SUMMARY OF THE INVENTION

One aspect of the present invention is the process for making an air depolarized electrochemical cell comprising the steps of: (a) preparing an active layer of an air electrode comprising a catalytically active material and a binding material; (b) preparing a hydrophobic layer of an air electrode comprising a microporous membrane having an air permeability of about 50 to about 800 seconds; (c) laminating the active layer and the hydrophobic layer with sufficient force, applied uniformly across the entire surface of the electrode, to produce a laminated air electrode with an air permeability of about 5000 to about 20,000 seconds; and (d) combining the air electrode with a separator, a negative electrode, and an electrolyte in a.cell housing; wherein the air permeability is the time required for 0.153 in$^3$ (2.5 cm$^3$) of air under constant pressure of 12.2 inches of water (0.44 psi) to pass through a part of a sample 0.1 in$^2$ (0.645 cm$^2$) in area.

Another aspect of the present invention is an air depolarized electrochemical cell comprising a cell housing; a negative electrode; a laminated air electrode having an active layer comprising a catalytically active material and a binding material, a hydrophobic layer comprising a microporous membrane having an initial air permeability of about 50 to about 800 seconds prior to use within the cell, a laminated electrode air permeability of about 5000 to about 20,000 seconds, and a uniform density in the active area of the electrode; and a separator disposed between the negative electrode and air electrode.

Yet another aspect of the present invention is an air electrochemical cell comprising an air electrode having an air active material. The air electrochemical cell further comprises a polytetrafluoroethylene (PTFE) uniformly laminated on the air electrode wherein the PTFE-laminated air electrode has an air permeability from about 5000 seconds to about 20,000 seconds and an average peel strength of greater than about 90 g/in.

These and other features, advantages and objects of the present invention will be further understood and appreciated by those skilled in the art by reference to the following specification, claims and appended drawing.

BRIEF DESCRIPTION OF THE DRAWINGS

The FIGURE is an elevational cross sectional view of a miniature air cell of the type that can embody the present invention.

DETAILED DESCRIPTION OF THE PREFERRED EMBODIMENTS

The present invention relates to a process for manufacturing a button air cell with an air electrode, and the button air cell produced by that process. The resulting air electrochemical cell has improved performance over currently available air electrochemical cells in high humidity conditions or low humidity conditions.

The process includes generally the steps of forming a sheet of material that can be used as a positive air electrode in an electrochemical cell; embedding a current collector screen into the first side of the positive air electrode sheet; providing a polytetrafludroethylene (PTFE) sheet having a high air permeability; laminating the PTFE sheet onto the positive air electrode sheet using high relative force to achieve an air permeability of the positive air electrode sheet of from about 5000 seconds to about 20,000 seconds; applying a separator onto the positive air electrode sheet over the current collector screen; punching an air electrode disk from the positive air electrode sheet; inserting the air electrode disk into a cathode container; assembling an anode half-cell comprising an anode cup, an active material, and an electrolyte; adjoining the cathode container with the anode cup to form an electrochemical cell; and sealing the electrochemical cell.

The positive air electrode material may be any material suitable for use in an air electrode, but is preferably a mixture of carbon, manganese oxide ($MnO_x$), and tetrafluoroethylene (TFE) The mixture also optionally contains a surfactant often present in the TFE. The mix is formed into a thin sheet between one or more pairs of calendar rollers to form a long sheet of the desired thickness and density. Any suitable process may be used. For example, the mix may be fed through a hopper and then compressed.

After trimming the sheet to the desired width, the current collector screen is then embedded into one side of the sheet of the air electrode material. The current collector is preferably a nickel exmet screen. The current collector is embedded into the air electrode sheet using any suitable method such as compression between one or more sets of rollers. After the exmet screen is embedded, the air electrode has a thickness of from about 0.010 inch (0.025 cm) to about 0.013 inch (0.033 cm) and a density, including the embedded current collector, of about 15.08 $g/in^3$ (0.92 $g/cm^3$).

Next, the PTFE is laminated onto the air electrode sheet using a roll-type laminator. The PTFE, before lamination, has an air permeability in the range of about 50 to about 800 seconds (which is the time for 0.153 $in^3$ (2.5 $cm^3$) of air under constant pressure of 12.2 inches of water (0.44 psi) to pass through a sample of the PTFE having an area of 0.1 $in^2$ (0.645 $cm^2$)). Preferably, the PTFE has an air permeability of about 90 seconds to about 500 seconds and more preferably has an air permeability of about 100 seconds to about 200 seconds. The test method for determining the air permeability of the PTFE and the air electrode is described in detail below. The PTFE is preferably laminated onto the opposite side of the air electrode sheet as the current collector screen. Preferably, the laminated electrode has a thickness of about 0.006 inch (0.015 cm) to about 0.020 inch (0.051 cm). Optionally, liquid TFE may be applied to the surface of the PTFE film and/or the surface of the air electrode sheet to further improve adhesion of the PTFE to the air electrode. Other suitable microporous hydrophobic films, such as air permeable polyolefins and fluoropolymers that are stable in the cell, may be used in place of PTFE. Examples include but are not limited to fluorosilicone polymers, polyorganosiloxanes, polyethylene and polypropylene. Suitable hydrophobic films may also be impregnated or coated with other materials to enhance their performance.

One or more layers of separator are then applied to the electrode, covering the side of the electrode with the embedded current collector screen. The separator is preferably a microporous polypropylene film, but may be of any material known in the art to provide an adequate separator for an electrochemical cell.

Electrode disks for use in button cells are then removed from the electrode sheet, for example by using a punch. The disks are each individually inserted into a cathode can.

Lastly, an anode cup, a gasket, a negative electrode (anode), an electrolyte, and the air electrode are combined to form an electrochemical cell. It is contemplated that the electrode sheet may be used in a "jellyroll" type cell, in which case an electrode assembly is formed and inserted into the cell container.

The FIGURE shows an air electrode cell 1 containing a negative cup 3 with a negative electrode 5 (zinc and electrolyte), a positive can 7 with a positive electrode 9 (air electrode) and a gasket 11 disposed between and electrically insulating cup 3 from can 7. A separator 13 is shown disposed between negative electrode 5 and positive electrode 9. The positive electrode 9 is shown comprising a nickel screen 15 and a positive electrode mix 17. However, in practice, nickel screen 15 would substantially be embedded into the positive electrode. A gas permeable PTFE layer 19 is disposed over positive electrode 9 and an air distributing member 21 is disposed below layer 19. A hole 23 is punched into the bottom of can 7 to act as an air entry port. The cell as shown in the drawing, shows that the can 7 is in electrical contact with the positive electrode 9 and the cup 3 is in electrical contact with negative electrode 5 and that the terminals of the cell are on opposite ends.

The test method for determining the air permeability measures the time required to force a fixed volume of air through a fixed area of an air electrode sample. The air permeability is inversely proportional to the measured time. A Gurley densometer is used to determine the air permeability of the sample. The sample of the air electrode is cut from the air electrode sheet. The sample is then clamped in place in the densometer over an orifice measuring 0.1 $in^2$ (0.645$cm^2$), and the densometer timer is set to "0". Air is forced through the sample and the time is measured for the given volume of air to pass through the fixed-area sample. The longer the time, the lower the air permeability of the sample.

Limiting current measurements are also used to help determine the ability of cells to operate in high current drain applications. The limiting current measure indicates the electric current that a battery can deliver under steady state conditions at a useful voltage. As the current drain is increased, there is a current drain value that will drive the battery voltage to zero. This is the true limiting current of a battery. However, for practical reasons, it is more useful to define a limiting current in terms of some useful, non-zero voltage. A preferred method for measuring the practical limiting current (PLC) of an electrochemical cell is to apply a constant voltage of 1.1 volts to the cell and measure the current at 1 minute. The measure of the PLC is made after the cell achieves a steady state. At a fixed voltage, electrochemical cells can deliver large current pulses for short periods of time, but soon level out at an equilibrium current level.

The following examples are given to show the effect of the different laminating pressures of the PTFE on the air electrode.

EXAMPLE 1 (CONTROL)

Example 1 is a control example to show the parameters of a button air electrode cell as currently manufactured and marketed. A PTFE-laminated air electrode was manufactured using a relative laminating force of 51. Any suitable PTFE film may be used, but a preferred PTFE film has a thickness of about 0.004 inches (0.010 cm), an apparent density of about 26.22 $g/in^3$ (1.60 $g/cm^3$), and an air permeability of about 100 seconds to about 200 seconds. The roll-type laminator preferably has six inch-diameter rollers and a nip gap of about 0.004 inch (0.010 cm) to about 0.015 inch (0.038 cm). The laminated electrode has a thickness of about 0.010 inch (0.025 cm) to about 0.020 inch (0.051 cm).

The weight percentages of the air electrode were 75.00% carbon, 5.00% MnO$_2$, and 20.00% TFE. This results in volume percentages of approximately 78.09% carbon, 2.38% MnO$_2$, and 19.53% TFE. The density of the mixture at room temperature was 35.89 g/in$^3$ (2.19 g/cm$^3$). The density of the electrode sheet was 13.27 g/in$^3$ (0.81 g/cm$^3$). After the exmet screen is embedded, the air electrode has a thickness of from about 0.011 inch (0.028 cm) to about 0.013 inch (0.033 cm) and a density, including the embedded current collector, of about 15.08 g/cm$^3$ (0.92 g/cm$^3$). The final thickness of the laminated air electrode is between about 0.014 inch (0.036 cm) and about 0.017 inch (0.043 cm). The resultant air permeability of the PTFE-laminated air electrode is typically in the range of 1000 to 3000 seconds for 0.153 in$^3$ (2.5 cm$^3$) of air, under constant pressure of 12.2 inches of water (0.44 psi), to pass through a 0.1 in$^2$ (0.645 cm$^2$) portion of a sample of the PTFE-laminated electrode. The air electrode was used in an AC 13 (PR 48) cell, which has one air hole in its positive can, the air hole having a diameter of 0.020 inch (0.051 cm). The AC 13 (PR 48) cell has an air electrode area of 0.043 in (0.277 cm ). The limiting current of the AC 13 (PR 48) cell using an air electrode made in this manner was 10±1 mA.

The membrane peel strength for the air electrode laminate was also measured. The procedure is designed to measure the bond strength between the PTFE membrane and the air electrode stock. The test measures the force required to peel the PTFE membrane away from the air electrode stock. A TEFLON® Membrane Peel Tester (model number PCD200 by Chatillon of Greensboro, N.C.) is fitted with a one-inch wide serrated jaw clamp to completely and firmly hold the sample. The clamp can be any suitable clamp, for example, a G1008 film and paper grip clamp. The apparatus is used with a digital force gauge (for example, a DGGS gauge). The apparatus is programmed with a bottom stop where the clamps are approximately one inch apart. The top stop allows the clamps to separate to about two inches. The speed for the peel is set to 2.5 inches (6.35 cm) per minute and the gauge is set to read in the compression mode. The top clamp is brought to the bottom stop position and the force gauge is zeroed. A piece of electrode is cut that is approximately 1.5 inches (3.81 cm) long and the PTFE is peeled back from one cut edge no more than a half inch. The air electrode foil is clamped to the bottom clamp and the PTFE to the top clamp without creasing the electrode. The "up" arrow button on the TEFLON® Membrane Peel Tester is pushed, and the readout on the gauge is monitored. The upward force causes the PTFE membrane to delaminate from the electrode stock. The initial high reading during the peel process is recorded. The gauge readout is recorded on a specific time interval, and the readings are later averaged. Peel strength is expressed in terms of force per unit width of sample, for example, grams per inch. The average peel strength of the air electrode of Example 1 was 76 g/in (29.92 g/cm).

Examples 2 and 3 used a slightly higher relative laminating force than that of Example 1.

EXAMPLE 2

A PTFE-laminated air electrode was manufactured using the process described above using a relative laminating force of 61.5. The average peel strength was 81 g/in (31.89 g/cm) and the limiting current of an AC 13 (PR 48) the cell was 8.5±1.2 mA.

EXAMPLE 3

A PTFE-laminated air electrode was manufactured using the process described above using a relative laminating force of 67.5. The average peel strength was 86 g/in (33.86 g/cm). The limiting current of an AC 13 (PR 48) cell with an air electrode according to Example 3 was 8.4±1.2 mA.

Examples 4 and 5 represent the preferred embodiments of the present invention.

EXAMPLE 4

A PTFE-laminated air electrode was manufactured using the process described above using a relative laminating force of 81. The resultant air permeability of the PTFE-laminated air electrode was in the range of 9000 to 16,000 seconds for 0.153 in$^3$ (2.5 cm$^3$) of air, under constant pressure of 12.2 inches of water (0.44 psi), to pass through a 0.1 in$^2$ (0.645 cm$^2$) sample of the PTFE-laminated electrode. The average peel strength was 104 g/in (40.945 g/cm). The limiting current of an AC 13 (PR 48) cell with an air electrode according to Example 4 was 6.9±1.2 mA.

EXAMPLE 5

A PTFE-laminated air electrode was manufactured using the process described above using a relative laminating force of 102. The resultant air permeability of the PTFE-laminated air electrode was in the range of 9000 to 16,000 seconds for 0.153 in$^2$ (2.5 cm$^3$) of air, under constant pressure of 12.2 inches of water (0.44 psi), to pass through a 0.1 in$^2$ (0.645 cm$^2$) sample of the PTFE-laminated electrode. The average peel strength was 110 g/in (43.307 g/cm). The limiting current of an AC 13 (PR 48) cell with an air electrode made according to Example 5 was 5.0±1.2 mA.

As shown by the Examples, the lamination of the PTFE using a higher relative force results-in a higher air permeability value (a longer time for 0.153 in$^3$ (2.5 cm$^3$) of air under a constant pressure of 12.2 inches of water (0.44 psi) to pass through 0.1 in$^2$ (0.645 cm$^2$)), which results in better performance in extreme high and low humidity situations. Also, the higher relative laminating forces resulted in higher average peel strengths which are preferable to prevent delamination of the PTFE from the air electrode. It is preferred to have an average peel strength greater than about 90 g/in (35.43 g/cm), and a more preferred average peel strength is greater than about 100 g/in (39.37 g/cm).

Generally, higher limiting currents are preferred for heavy drain applications. While the limiting currents for cells made according to Example 1 are higher than those for cells made according to the invention, cells of the invention have limiting currents that are adequate for the majority of applications for button air cells.

As noted above, a preferable air permeability range for increased cell performance in high or low humidity conditions is about 5000 seconds to about 20,000 seconds for the test parameters given above. A more preferred range is from about 7000 seconds to about 18,000 seconds; an even more preferred range is from about 8000 seconds to about 17,000 seconds; and a most preferred range is from about 9000 seconds to about 16,000 seconds.

Under "normal" ambient humidity (50% relative humidity) conditions, the discharge capacity (1500 ohms to 0.9 volt) of AC 13 (PR 48) cells made according to Example 5 was comparable to that of AC 13 cells made according to Example 1. Under high ambient humidity (75% to 90% relative humidity) conditions, AC 13 cells made according to Example 5 provide more than 35 percent more capacity than AC 13 cells made according to Example 1.

The above description is considered that of the preferred embodiments only. Modifications of the invention will occur to those skilled in the art and to those who make or use the invention. Therefore, it is understood that the embodiment shown in the drawing and described above is merely for illustrative purposes and not intended to limit the scope of the invention, which is defined by the following claims as interpreted according to the principles of patent law, including the doctrine of equivalents.

The invention claimed is:

1. A process for making an air depolarized electrochemical cell comprising the steps:
   (a) preparing an active layer of an air electrode comprising a catalytically active material and a binding material;
   (b) preparing a hydrophobic layer of an air electrode comprising a microporous membrane having an air permeability of about 50 seconds to about 800 seconds;
   (c) laminating the active layer and the hydrophobic layer together with sufficient force applied uniformly across the entire surface of the electrode to produce a laminated air electrode with an air permeability of about 5000 seconds to about 20,000 seconds; and
   (d) combining the air electrode with a separator, a negative electrode, and an electrolyte in a cell housing;
   wherein said air permeability is the time required for 2.5 $cm^3$ of air under constant pressure of 12.2 inches of water to pass through a part of a sample 0.1 $in^2$ in area.

2. The process defined in claim 1 wherein the laminating is performed at a sufficient force to produce an air electrode having an average peel strength greater than about 90 g/in between the active layer and the hydrophobic layer.

3. The process defined in claim 2 wherein the laminating is performed at a sufficient force to produce an air electrode having an average peel strength greater than about 100 g/in between the active layer and the hydrophobic layer.

4. An air depolarized electrochemical cell comprising:
   a cell housing;
   a negative electrode;
   a laminated air electrode comprising:
      an active layer comprising a catalytically active material and a binding material,
      a hydrophobic layer comprising a microporous membrane having an initial air permeability of about 50 seconds to about 800 seconds prior to use within the cell,
      a laminated air electrode air permeability of about 5000 seconds to about 20,000 seconds, and
      a uniform density; and
   a separator disposed between the negative electrode and the air electrode.

5. The air depolarized electrochemical cell defined in claim 4 wherein the laminated air electrode has an average peel strength greater than about 90 g/in between the active layer and the hydrophobic layer.

6. The air depolarized electrochemical cell defined in claim 5 wherein the laminated air electrode has an average peel strength greater than about 100 g/in between the active layer and the hydrophobic layer.

7. A process for manufacturing an electrochemical cell comprising the steps of;
   (a) providing a sheet of material that can be used as the active material in an air electrode in an electrochemical cell, the sheet having a first side and a second side;
   (b) embedding a current collector screen onto the first side of the air electrode sheet; and
   (c) laminating a high permeability membrane onto the second side of the air electrode sheet, the high permeability membrane having an air permeability of about 50 seconds to about 800 seconds before lamination, and the air electrode sheet having an air permeability of from about 5,000 to about 20,000 seconds after lamination;
   wherein the air permeability is the time required for 2.5 $cm^3$ of air under constant pressure of 12.2 inches of water to pass through a 0.1 $in^2$ sample.

8. The process of claim 7 and further including the step of applying a separator onto the positive air electrode over the current collector screen after the step of laminating.

9. The process of claim 8 and further including the step of punching out an air electrode disk from the air electrode sheet after the step of applying the separator.

10. The process of claim 9 and further including the step of inserting the air electrode disk a cathode container after the step of punching out the air electrode disk.

11. The process of claim 10 and further including the step of assembling an anode half cell comprising an anode cup, an active material, and an electrolyte after the step of inserting the air electrode disk into he cathode container.

12. The process of claim 11 and further including the step of adjoining the cathode container with the anode cup to form an electrochemical cell, after the step of assembling the anode half cell.

13. The process of claim 12 and further including the step of sealing the electrochemical cell after the step of adjoining the cathode container with the anode cup.

14. An air electrochemical cell comprising:
   an air electrode comprising an air active material;
   a high permeability membrane having an initial air permeability of about 50 seconds to about 800 seconds prior to use within the cell uniformly laminated on the air electrode wherein the membrane-laminated air electrode has an air permeability of from about 5000 seconds to about 20,000 seconds and wherein the membrane-laminated air electrode has an average peel strength of greater than about 90 g/in between the active material and the high permeability membrane.

15. The air electrochemical cell defined in claim 14 wherein the high permeability membrane is polytetrafluoroethylene (PTFE).

16. The air electrochemical cell defined in claim 14 wherein the membrane-laminated air electrode has an air permeability of from about 7000 seconds to about 18,000 seconds.

17. The air electrochemical cell defined in claim 14 wherein the membrane-laminated air electrode has an air permeability of from about 8000 seconds to about 17,000 seconds.

18. The air electrochemical cell defined in claim 14 wherein the membrane-laminated air electrode has an air permeability of from about 9000 seconds to about 16,000 seconds.

19. The air electrochemical cell defined in claim 14 wherein the air electrode comprises carbon, manganese oxide ($MnO_x$), and tetrafluoroethylene (TFE).

20. The air electrochemical cell defined in claim 19 wherein the high permeability membrane is polytetrafluoroethylene (PTFE).

21. The air electrochemical cell defined in claim 19 wherein the membrane-laminated air electrode has an air permeability of from about 7000 seconds to about 18,000 seconds.

22. The air electrochemical cell defined in claim 19 wherein the membrane-laminated air electrode has an air permeability of from about 8000 seconds to about 17,000 seconds.

23. The air electrochemical cell defined in claim 19 wherein the membrane-laminated air electrode has an air permeability of from about 9000 seconds to about 16,000 seconds.

* * * * *